Dec. 29, 1942. D. MIDDLEMAN 2,306,740
PORTABLE WHEEL SCALE
Filed Feb. 14, 1940 4 Sheets-Sheet 1
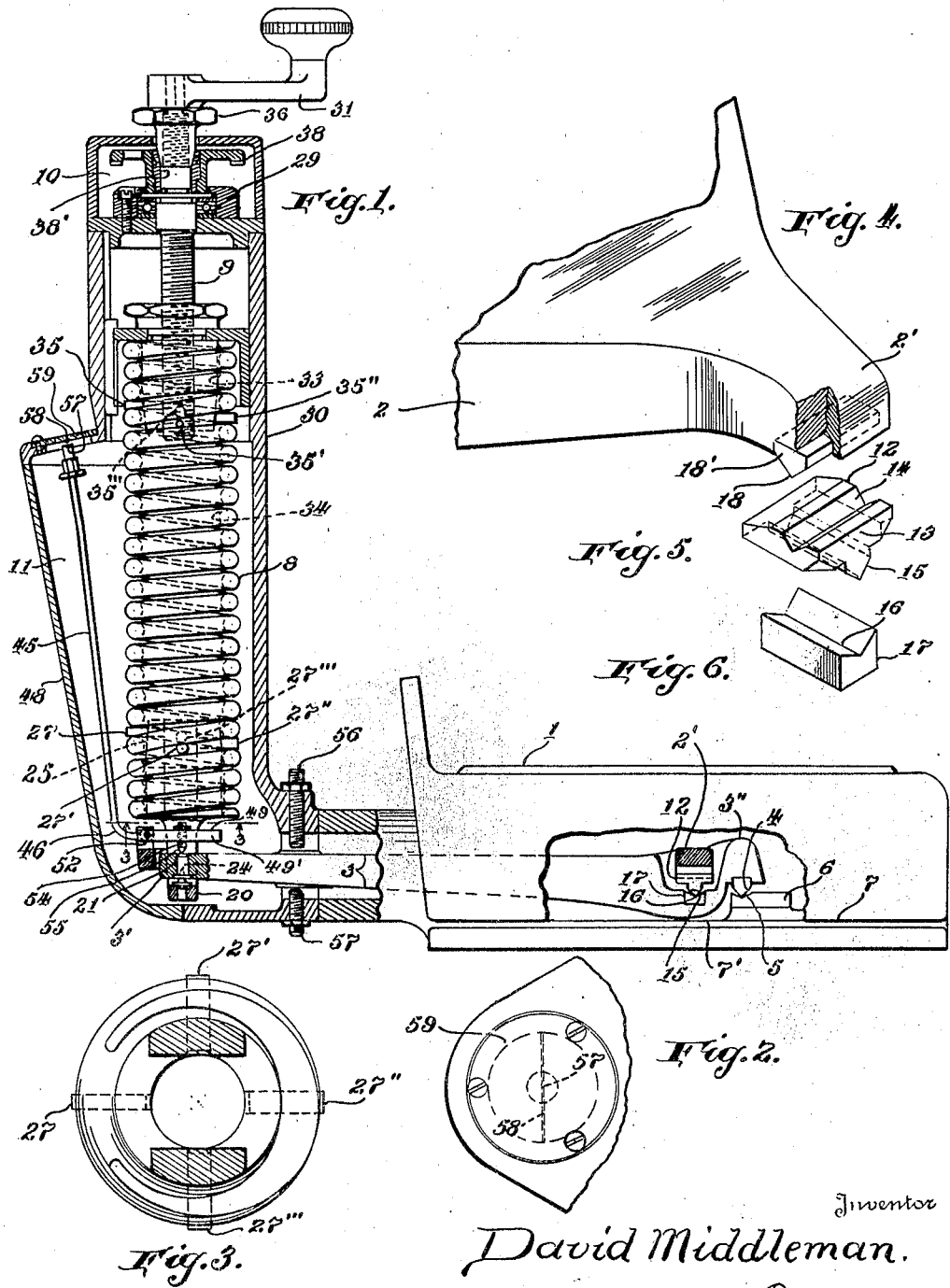
Inventor
David Middleman.
By Edwin F. Samuels
Attorney
Witness.

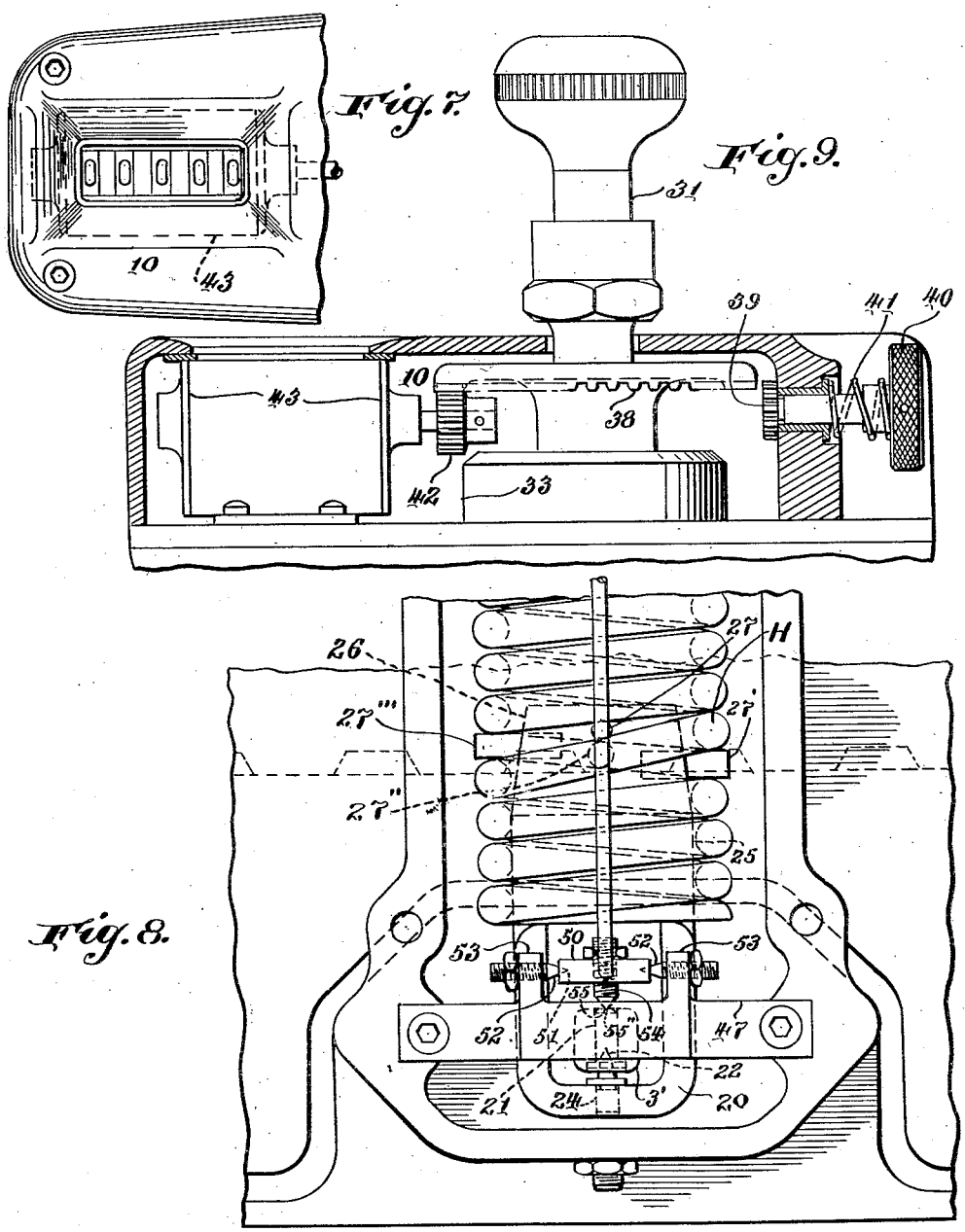

Dec. 29, 1942.   D. MIDDLEMAN   2,306,740
PORTABLE WHEEL SCALE
Filed Feb. 14, 1940   4 Sheets-Sheet 3
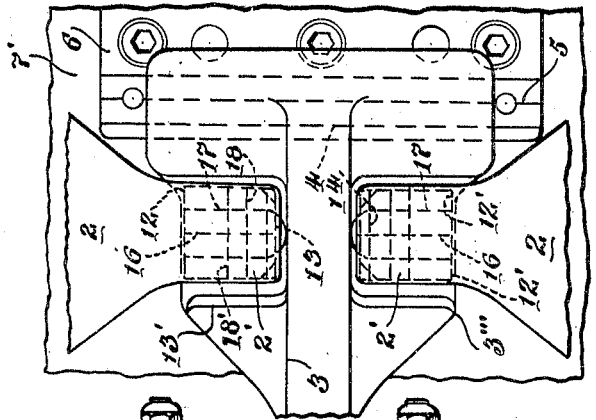
Fig. 10.
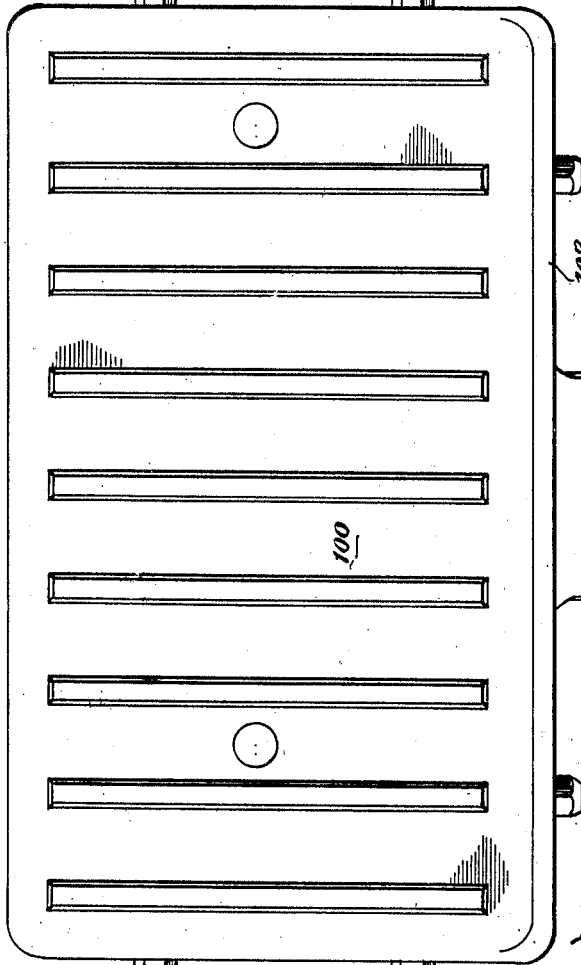
Fig. 13.
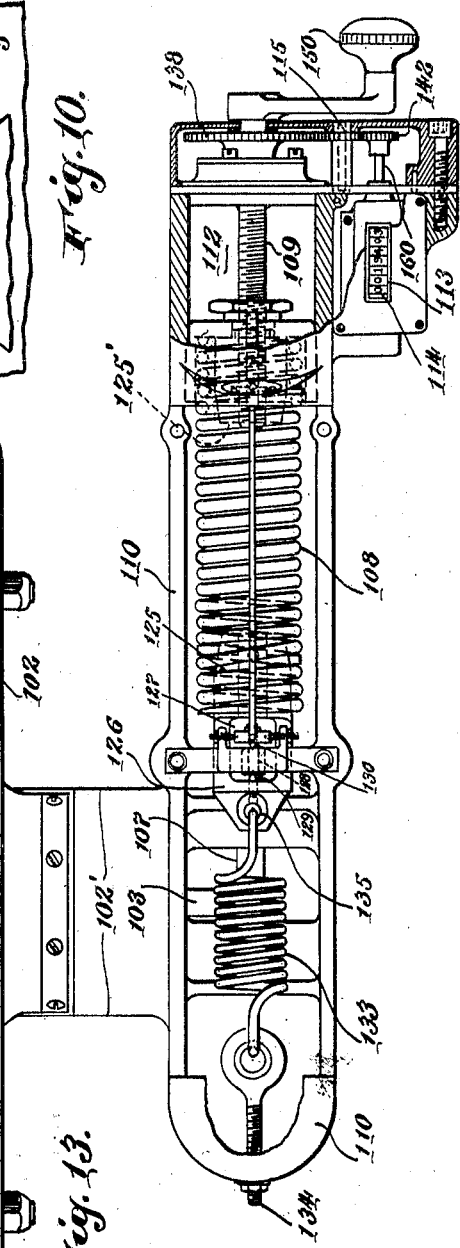
Inventor
David Middleman.
By Edwin T. Samuels
Attorney
Witness
P. H. Flautt

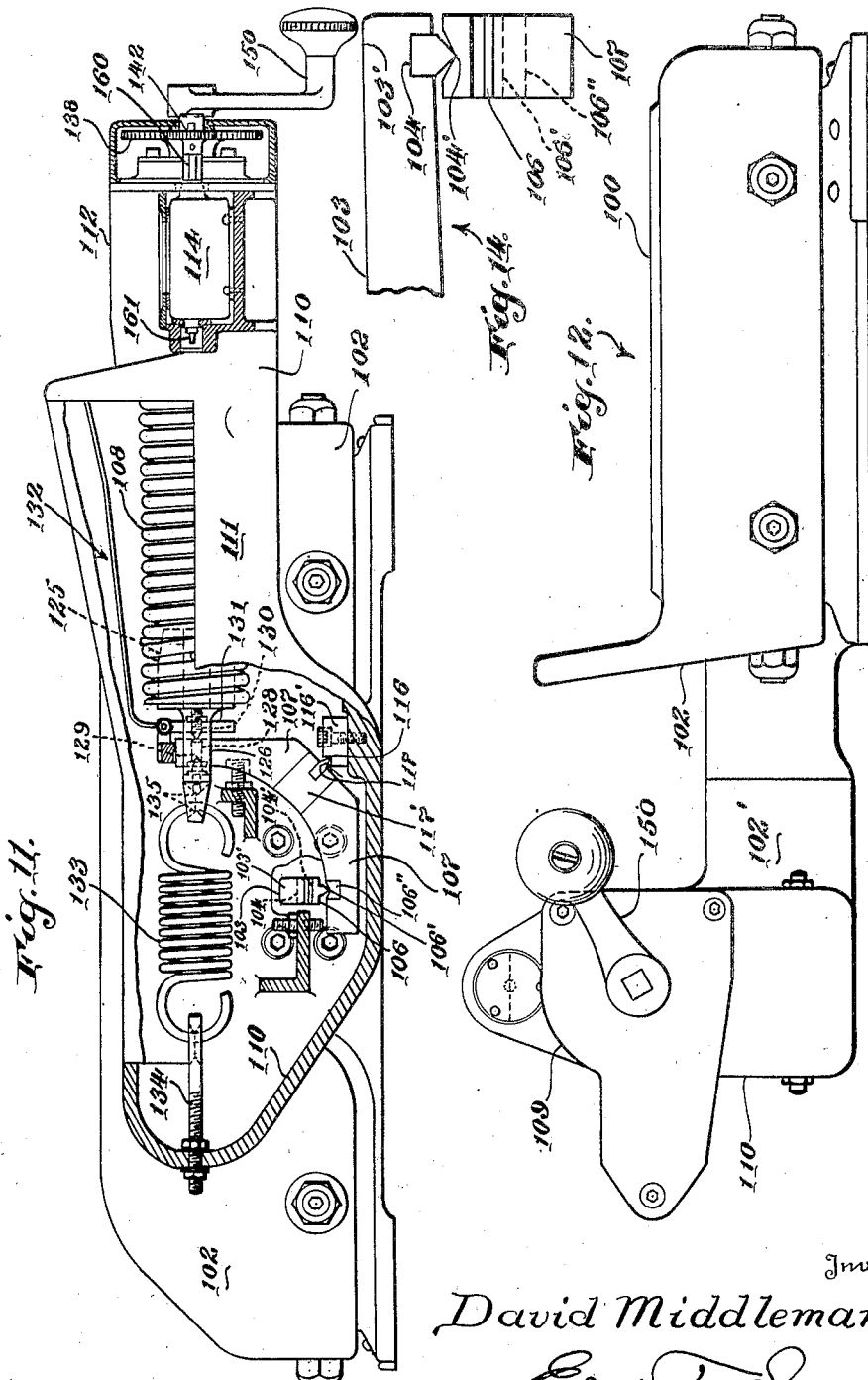

Patented Dec. 29, 1942

2,306,740

UNITED STATES PATENT OFFICE 2,306,740

PORTABLE WHEEL SCALE

David Middleman, Baltimore County, Md., assignor to The Black and Decker Manufacturing Company, a corporation of Maryland Application February 14, 1940, Serial No. 318,826

15 Claims. (Cl. 265—68)

The present invention relates to improvements in the wheel scale as illustrated in United States Patent No. 2,156,325 granted to the assignee of the present application. The object of the invention is:

First, to provide an improved transfer assembly for transmitting pressures proportionate to the loads from the platform levers which support the platform, by way of the scale beam to the balancing spring for determination;

Second, to provide improved means for mounting the spring at its opposite ends for the purpose of maintaining a straight spring axis at all times and hence maintaining a straight line transfer of the spring tension set up in balancing the beam in no-load and loaded condition respectively which tension is proportionate to the load and gives a proportionate elongation of the spring from no-load to loaded condition which elongation is in turn utilized as a means for measuring the load;

Third, to provide an improved counter or computing device whereby the said elongation is measured in terms of the load and the load is indicated in pounds or other suitable unit;

The invention also relates to the features and combinations of features hereinafter described and illustrated in the drawings, the order in which the said improvements are mentioned having no relation to their importance and variation of all details and combinations being contemplated.

In the drawings:

Fig. 1 is a side elevation of the apparatus, the spring casing being sectioned on the plane of the spring axis and the center line of the beam, the platform or base casing being broken away to show the beam and knife edges and co-operating parts whereby the load is transferred from the platform to the beam, the platform lever shown, being broken away and sectioned on the vertical plane of the knife edge carried thereby.

Fig. 2 is a plan view of the cross-hair window or crystal and mounting for the balance indicator.

Fig. 3 is a section on the line 3—3 in Fig. 1, looking upwardly.

Figs. 4, 5 and 6 are detail perspective views of the knife edges and transfer blocks by which the load is transferred to the beam from the swinging ends of the platform levers said parts being slightly separated from their operative relation for convenience of illustration.

Fig. 7 is a top plan view of the counter cylinder and window and the surrounding parts.

Fig. 8 is a fragmentary elevation on an enlarged scale of the lower end of the spring and lower spring mounting and the balance idicating lever, pivot and co-operating parts for transmitting the condition of the beam as to balance to said indicator lever the cover of the casing being removed.

Fig. 9 is a fragmentary elevation of the upper end of the upper spring mounting and counting mechanism, the casing being shown in section.

Fig. 10 is a fragmentary plan view of the transfer mechanism and beam.

Fig. 11 is an elevation of a modified form of the apparatus, the spring casing being broken away and sectioned on a plane of the spring axis to show the spring and co-operating parts.

Fig. 12 is an elevation of the apparatus seen from the right in Fig. 11.

Fig. 13 is a top plan, portions of the spring casing being removed and the indicator housing being sectioned to show the underlying parts.

Fig. 14 is a fragmentary elevation on an enlarged scale looking at the beam end and transfer block from the left as seen in Fig. 11.

Referring to the drawings by numerals each of which is used to indicated the same or similar parts in the different figures, and having reference to Figs. 1 to 10 showing the first form of the invention; the construction shown comprises a platform 1, arranged substantially as in the above cited patent. This platform is mounted on platform levers 2 which may correspond rather closely to the levers 20 of the prior patent. This type of lever being well known in the art need not be fully illustrated.

The platform levers 2 which are similar to the prior patent in the manner in which they are mounted on the base and the manner in which they support the platform, are in turn supported at their swinging ends upon the scale beam 3 as hereinafter described. The scale beam 3 as shown is fulcrumed beneath the platform on a knife edge 4 which engages a knife edge seat 5 in a stationary block 6 mounted on the base 7' in casing 7 beneath the platform.

The swinging end of the beam 3 at 3' is connected to the balance spring 8 as further described and this balance spring is placed under tension or the tension thereof is regulated by means of a screw 9 by which the spring 8 is elongated from no-load condition in balancing the load, the elongation or deflection being measured by the counter indicated in a general way by reference character 10. The balanced condition of the beam in no-load and in loaded position is indicated by the balance indicating mechanism 11.

The swinging ends 2' of lever 2 of which there are two, as in the previous patent are in the preferred form illustrated, supported on the beam 3 by means of a transfer device closely adjacent fulcrum 4 and shown in the form of two transfer blocks 12 and 12' shown in plan in broken lines in Fig. 10. These are provided in duplicate, the block 12 being illustrated in perspective in Fig. 5. This transfer block 12, the description of one of these blocks being regarded as sufficient, has on its upper surface a knife edge seat 14 and it also has depending from its lower side at right angles to the seat 14 and beneath its longitudinal center the knife edge 15. The knife edges 15 of the two transfer blocks 12 and 12' engage seats 16 formed in two seating blocks 17 inserted in the upper side of the beam 3 as shown in Figs. 1 and 10, the beam 3 having a widened portion 3''' for this purpose. The blocks 17 are placed in alignment at right angles to the length of the beam 3, likewise having their seats 16 in alignment. The transfer blocks 12 and 12' are placed with their end surfaces 13 opposed. These blocks 12 and 12' are free to rock relatively to each other and to rock freely relatively to the blocks 17, containing seats 16 for the knife edges 15. The blocks 17 and particularly the seats 16 are spaced outwardly toward the spring 8 from the fulcrum knife edge 4 which supports the beam at its pivoted end 3'', which spacing gives a short lever arm 4—15, the long arm of the beam being 4—24. The seating blocks 17 and transfer blocks 12 and 12' as well as the blocks 18' with their knife edges 18 are formed of hard or hardened material.

The transfer blocks 12 and 12' resting on the beam 3 by way of knife edges 15 in seats 16 support the inner ends 2' of the platform levers 2, the knife edges 18 depending from said ends 2' being supported in the knife edge seats 14 of the transfer blocks 12 and 12'. This arrangement provides a universal frictionless engagement of the levers 2 and the beam 3 in all directions and interposes no resistance whatever to transmission of the downward stress of the load on the platform 1 through said levers 2 and beam 3 to the spring 8 as hereinafter described; the downward tendency applied to the lower end of spring 8 being thus maintained in direct proportion to the load without reduction by any frictional or torsional tendency. The term "knife edge means" is used herein to indicate either the seat or the knife edge seated therein which members co-operate in each instance to give a knife edge engagement, and "co-operating knife edge means" is used to indicate a knife edge operatively engaging a corresponding concave seat.

The scale beam 3, at its swinging end 3', remote from the fulcrum knife edge 4 engages a yoke 20, see Figs. 1 and 8. This yoke 20 is connected to the lower end of the balance spring 8 which is mounted at both ends as hereinafter described in such a way as to maintain a straight spring axis at all times, the spring 8 being of the closed helical type and placed under tension to balance the beam. This gives an elongation or deflection of the spring in exact proportion to the load.

In the form of the invention shown, the beam 3 is provided with a firmly seated upright hardened member 21 shown in the form of an upright pin which in the center position, i. e., the balanced or weighing position of the beam is aligned axially with the axis of the spring 8, though the provision of this member in the form of a pin is a matter of convenience. This pin or other hardened portion has a downwardly disposed cup or cavity 22 of approximately conical shape, the center and axis of which in the balanced position of the beam is in line with the spring axis. This cup is engaged by an upwardly extending pin 24, which is seated in the yoke 20 and is also in alignment with the spring axis.

The yoke 20 is provided with means whereby it is connected to spring 8 for the purpose above described. As shown the yoke is formed integrally with or secured to and depends from a spring insert 25 shown as in the form of a cylinder which fits within the central cavity 34 of the spring 8 being preferably of a reducing taper at 26, toward its upper end which taper causes it to enter easily within the spring and prevents active coils from touching the yoke.

The spring 8 is engaged with or connected to the insert 25 in the preferred construction shown, by means of four pins 27, 27', 27'' and 27''', see particularly Figs. 1, 3, and 8, shown as seated in the insert 25 and radiating therefrom.

These pins as shown are also radially related to the spring axis and are 90° apart which is the most convenient angle. The pins 27', 27'' and 27''' as shown are of equal diameter, the pin 27 which is nearest the longitudinal center of the spring being of less diameter, the pitch of the spring helix being less or closer in the intermediate portions than at the ends where it engages the inserts. The effective diameter of the pins is in the direction of the spring axis and they are so located as to form with their lower elements or surfaces a single helix at H of varying lead or pitch, the lead such as to correspond to or equal that which the spring would naturally assume when screwed on to two pins of equal diameters said pins being 180° apart and set with their lower surfaces on a lead or pitch equal to that of the free or unloaded spring. The purpose of this mounting is to maintain a straight axis at all times, i. e., to transfer the load to the spring in such a way that it will be equally distributed to all four points on the spring, contacted by the lower surfaces of pins 27, 27', 27'' and 27''', thus maintaining the spring axis straight, assuming that the tension is likewise equally supported at the upper end of the spring which is the purpose of the upper spring mounting now to be described.

Tension is applied to the spring 8 to balance the beam by means of the screw 9 previously mentioned, the same being supported on ball thrust bearings 29, suitably mounted in and on the upper end of the casing tube 30, which encloses the spring. The screw 9 is rotated at the will of the operator to balance the beam, by means of a crank 31 connected to the upper end of the screw 9, the rotations of the screw being counted by the computing apparatus 10 to be further described whereby the rotations of the screw are translated into pounds weight on the platform 1.

The upper end of the spring is, in the form shown, for the purpose of engagement with the screw 9. secured to an insert 33 shown in the form of an insert which like the insert 25 is of a suitable diameter to fit closely within the cavity 34 within the spring and suitably tapered like the insert 25. There is also means for securing or connecting the spring 8 to the block or cylinder 33 so as to distribute the tension applied by screw 9 uniformly about the periphery of the spring to maintain the axis of the spring in a straight line.

The upper spring insert 33 which is internally threaded to engage the screw 9, referred to herein as a micrometer screw, is in the form shown provided with four radial pins 35, 35', 35'' and 35''', similar to pins 27, 27', 27'' and 27''', and arranged as described in connection with said pins 27, 27', 27'' and 27''', at the lower end of the spring. Pins 35, etc., are adapted to apply the tension of the screw 9 to spring 8 uniformly about the periphery of the spring so that the axis of the spring will be maintained in a straight line, it being understood that the action of these pins 35, 35', 35'' and 35''' is inverted as compared to that of pins 27, 27', 27'' and 27''', the upper surfaces of pins 35, etc., being in contact with the spring helix to apply the screw tension thereto in an upward direction.

The upper end of the screw 9 is provided not only with a crank 31 but with a gear 38 which is secured to the screw by means of any suitable releasable device as a nut 36 having a downwardly disposed tapered portion 37 which enters a corresponding taper in a bushing 38' in the gear hub, whereby said counting mechanism 10 is releasably connected to the screw, being released to give a corrected zero or no-load reading in the balanced no-load position of the platform and beam 3.

The gear 38, Fig. 9, which may be releasably secured to the screw 9, as above described, is operated when released by means of a reset wheel 39 operated by a thumb-wheel 40, and pressed manually when desired into engagement against the tendency of spring 41, the gear 39 being normally released by said spring.

The gear 38 secured to the screw 9 to be operated thereby is connected by a pinion 42 to a counter cylinder 43 to the shaft of which pinion 42 is secured. The cylinder is rotably mounted in suitable bearings, being operated by the screw 9 through the train described or any suitable gear train and adapted to indicate in pounds the pressure or loads applied to platform 1.

The beam 3 is first balanced in no-load condition, the counter being corrected, if necessary, as to the zero or no-load reading in this condition. The platform is then loaded and the beam is balanced.

The elongation of the spring from balanced no-load condition to the balanced loaded condition is measured by said counting mechanism to give the reading in pounds, a suitable gear ratio being worked out in any desired form, the one illustrated being of advantage in that each rotation of the indicator wheel or counter 43 represents a predetermined number of pounds as 100 pounds on the platform, or any suitable unit may be employed.

The balanced position of the beam in loaded and no-load conditions is indicated by a widely multiplying pointer lever 45 which is moved in widely multiplied ratio to the balancing action of the beam 3. This multiplying pointer 45 is shown as the long arm of a bell crank lever 46 pivoted adjacent the end of the beam on a stationary bracket 47 secured to the casing immediately inside the cover 48.

For the purpose stated, the short arm and pivot portions of the bell crank lever 46 are made in the form of a T, said short arm being indicated by reference character 49, the ends of the cross arm 50 of the T having aligned pivot cavities 51 which are engaged by pivot pins 52 disposed inwardly or toward said cavities and adjustably secured in the ears 53 projecting upwardly from the bracket 47 on each side of the lever 46.

The short arm 49 which is the shank of the T referred to, is also provided intermediately of its length, i. e., between the pivots 52 and the swinging end 49', with an upright pin 54 having a depending point 55 which is in line with the axis of the spring 8 and bears at its lower end or point on the center 55'' of the upright pin 21 in the end of the scale beam 3. The pin 54 is shown threaded for adjustment relatively to the arm 49 to give a further zero correction.

This arrangement provides an exceedingly short arm from 52 to 55, from the line of pivot points 52 to the axis of the pin 54, whereby the pointer arm 45 is actuated by the swinging end of the scale beam 3.

It will be observed that the pointer arm 45 is many times as long as the said short arm whereby the balancing action of the beam is correspondingly multiplied being finally indicated by coincidence of a mark on the end of the pointer, 45 at 57, with a hair line 58 on the crystal 59 which is suitably located forming a window in the spring casing 30.

An important contribution to the accurate transmission of pressures proportionate to the loads and hence to accurate weighing, results from the straight line transmission of beam pressures to the spring 8 and the alignment in the direction of the spring axis of the beam pressure transmission point 24 with the spring axis. The arrangement of the indicator arm 45 and bell crank arm 49 in the central plane of the beam at right angles to its fulcrum knife edge 5 and the location of the bearing point 55 of the indicator on the beam 3 in alignment with the spring axis are of considerable advantage.

An important contribution to the accuracy of weighing also results from the universal frictionless engagement of the platform levers with the beam per se, and in combination with the arrangement for maintaining the spring axis in alignment as above defined.

It is also of interest that the motion of the beam 3 and hence of the platform 1 are closely limited by means of adjusting screws 56 and 57, shown on each side of the beam near its swinging end 3', in Fig. 1, the normal motion of the beam from no-load to balanced position and vice versa being less than one thirty-second of an inch which is slightly less than the space defined by the screws 56 and 57, and the motion of the platform thus limited by limiting of the motion of the beam being approximately one half of one thousandth of an inch. Thus the instrument in effect interprets the load in terms of static pressures proportionate to the weight of the load on the platform rather than in terms of depression of the platform, i. e., motion.

This fact is of great importance in that in loading the scale, it is placed in the road or other weighing area and the wheel of a heavy vehicle as a truck, a bus or an airplane or the like to be weighed is run on to it. There is a very sudden loading of a very delicate instrument with a corresponding tendency to destructive vibration. In thus loading the scale, it is notable that due to the close limitation of the motion of the beam and the platform, the vibration due to loading cannot be transmitted to the beam and to the delicate balance indicating mechanism 45, 51, 55, etc., or to computer 10 so that this delicate multiplying balance indicating mechanism and computing mechanism are not disturbed and further there is no excessive vibration of the spring or tendency to get it out of line or to in any way throw the counter out of adjustment. This is of great importance as the accurate results attained are dependant on extremely fine adjustment of these delicate mechanisms, particularly the balance indicating mechanism, counters and spring connections and beam connections, thus protected.

Important features of the invention are:

(1) The mounting of the spring at its ends for equal distribution of the stress to all sides of the spring whereby the spring axis is maintained in a straight line at all times avoiding errors due to lateral deflection.

(2) The transfer assembly for transmitting the load from the platform levers 2 to the beam 3 avoiding resistance due to torsion and friction in and between said levers and beam; and the point contacts in alignment with the spring axis whereby a downward tendency in exact proportion to the load is applied to the lower end of spring 8; and the corresponding arrangement of the balance indicating mechanism which causes the latter to respond with equal accuracy to the condition of the beam in balancing whereby the deflection or elongation of the spring 8 in balancing the load when interpreted in terms of pounds or other units as combined give an extremely accurate determination of the weight of the load.

(3) The recording mechanism or counter adapted for convenient correction as to the no-load reading so that the unloaded beam can be balanced at zero reading, the correction being substantially instantaneous without interfering in any way with the balance, the counter also being adapted to and provided with a gear ratio whereby each rotation of the counter cylinder may be made to represent a convenient number of pounds as 100 or 1000 pounds or other convenient units.

A modified form of wheel scale which is particularly adaptable to the weight determination of airplanes and other aircraft is shown in Figs. 11, 12 and 13. In this form of the invention the balancing spring and weight recording mechanism are in a horizontal position at the side of the platform and spaced laterally from the platform, being so placed in order to clear and avoid contact with low hanging landing gear or other portions of the under carriage of airplanes and the like. It is usable with any type of rubber tired vehicle to be weighed.

The details of the platform assembly 100, Figs. 12 and 13, including the platform levers 2, above described may be substantially as in the form of the invention above described in connection with Figs. 1 to 10. The beam 103, Fig. 11, is fulcrumed at its inner end within the platform casing on knife edge 4 in seat 5 and the platform levers 2 transmit pressures proportionate to the loads thereto by means of transfer blocks 12 and 12', engaging knife edges 13, the blocks being supported on the beam by knife edges 15 as in Figs. 2, 4, 5 and 6, or any suitable means may be employed for transmitting the load to the beam. The outer swinging end 103' of the beam 103, however, instead of being equipped and connected as at 3' in Figs. 1 and 8 is fitted with a knife edge block 104 having a knife edge 104' at right angles to the length of the beam and designed for co-operation with a transfesr block 106 having a suitable seat for edge 104'. This latter block 106 has a depending knife edge 106' at right angles to knife edge 104' and its seat. Knife edge 106' is shown as co-operating with a seat provided in a seating block 106'', inserted in a bell crank lever 107. The bell crank lever 107 is adapted to convert the limited vertical action of the outer free end 103' of the beam 103 providing a horizontal component to give horizontal displacement of the adjacent end of coil spring 108 corresponding to the coil spring 8 in the form of the invention already described. For this purpose the bell crank lever 107 is pivotally supported in any suitable manner, as for example, by means of the knife edge 117, projecting outwardly from the elbow 117' of said lever and engaging an opposed seat 116 in a hard seating block 116' on the casing. In the preferred form shown, the two arms of the bell crank lever 107 are of equal effective length giving a 1 to 1 ratio so that the majority of the parts of the two forms of scales are interchangable or usable in both types shown.

Still referring to Fig. 11, the spring balancing mechanism 111 including spring 108 and means for applying tension thereto is similar in many respects to the spring balancing mechanism shown in Fig. 1 and no detailed description thereof is believed to be necessary, it being sufficient merely to point out the departures that have been effected in order to accommodate the horizontal type of construction in Figs. 11, 12 and 13.

Referring again to Fig. 11, there is an insert 125 similar to the insert 25 and similarly connected to the spring 108. This insert is formed with a yoke 126 integral therewith or suitably connected thereto. This yoke has an eye 127 through which the upper end of the bell crank lever 107 extends. A hardened seat 128 shown as like pin 21 is fitted into the upper end of the bell crank lever 107 being engaged on one side thereof by a pin 129 carried by the yoke, and on the other side by a pin 130 carried by the short arm 131 of the widely multiplying balance indicating mechanism 132. This latter mechanism is likewise similar to the corresponding mechanism 45, 49, 51, 57, 58, etc., of Figs. 1, 2 and 8, and pins 129 and 130 are in alignment with the spring axis in accordance with the preferred construction illustrated.

In the form shown, a relatively light coil spring 133 is secured at one end to an adjusting screw 134 extending through the end of casing 110 opposite to the indicator 112 and balancing screw 109, and the other end thereof is attached to an eye 135 provided on the yoke 126. Thus any tendency of the spring 108 to become slack or to sag on account of its horizontal position is overcome, maintaining the spring 108 and its associated parts in perfect alignment. The downward tendency of the beam 103' is thus transformed to a horizontal pressure or tension and applied to spring 108 without loss by friction or torsion or disalignment of the spring axis, the spring 108 being connected at its outer end to the screw 109 by an insert 125' similar to insert 33.

The spring casing 110 which encloses the spring 108 has its length extending in a direction parallel to platform casing 102 being connected thereto by a tubular portion 102', Fig. 13, through which the beam 103 extends to lever 107. The spring 108 and casing 110 have associated therewith at their outer ends, corresponding to the upper end of casing 30, a load balancing and indicating mechanism 112 including a window or opening 113 (Fig. 13) through which the counter cylinder 114 is visible. The mechanism 112 is substantially identical with the balancing indicator mechanism 43, 9 and 10, Figs. 1, 7 and 9, with the exception of the type of reset mechanism and addition of an idler pinion 115, Fig. 13, which has been interposed between the main gear 138 and the pinion 142 corresponding to the gear and pinion 38 and 42 of the other form of the invention. This is provided to accommodate the indicator to the altered position of the counter window 113. In the indicator the cylinder 114 is connected to its shaft 160 by a ratchet and pawl or the equivalent not shown; and resetting is accomplished by turning the cylinder backward by means of a key engaging the square end of a stud 161 secured in the end of the cylinder 114 in line with said shaft 160.

The operation of the mechanism just described is similar to that described in connection with the upright form of the invention. Limited vertical movement of the beam 103 is translated by means of the bell crank lever 107 into horizontal displacement of the inner end of the spring 108 through the seat 128 and its associated instrumentalities, and thus by manipulating the hand crank 150 corresponding to the crank 31 the multiplying pointer mechanism 132 may be brought to its neutral position and the reading of the counter mechanism noted as previously described.

The second form of invention disclosed has particular advantages in that there are no upwardly projecting parts above the platform which is an important advantage in weighing low hung vehicles and particularly in the weighing of airplanes and other aircraft in which the landing gear is apt to contact any upwardly projecting portions of the instrument.

The resulting product made in either form disclosed is a wheel bearing pressure measuring instrument which is more sensitive, accurate and compact than any instrument for similar purposes hithertofore devised.

I have thus described specifically and in detail a manually portable wheel bearing pressure measuring instrument or wheel scale, embodying the features of my invention in the preferred form, the description being specific and in detail in order that the manner of constructing, applying and operating and using the invention may be fully understood, however, the specific terms are used descriptively rather than in a limiting sense, the scope of the invention being defined in the claims.

What I claim as new and desire to secure by Letters Patent is:

1. In a manually portable wheel scale of the drive-on type, having a platform and a beam for supporting the same, with means for transmitting the load on the platform to the beam in the form of a movement proportionate to said load and means for balancing the beam comprising a closed helical spring and means for applying tension to the spring and measuring the deflection thereof, said tension applying means and said beam being connected to opposite ends of said spring; means for thus connecting said spring at each end comprising an insert within the spring and means projecting from said insert between the coils of said spring, said latter means being spaced by substantially equal angles about the circumference of said spring and arranged in a helix of varying pitch corresponding to the pitch of the spring when unloaded and screwed on to two pins of equal diameters 180° apart and having a lead equal to one half the pitch of the unloaded spring, the axis of the spring being straight under all degrees of tension applied thereto from said inserts by drawing them apart.

2. A manually portable wheel load scale of the drive-on platform type, having a beam and means for transmitting to the beam pressures proportionate to the loads on the platform and also having means for balancing said pressure on the beam comprising a spring connected to the swinging end of the beam in opposition to the load and means for applying tension to the spring to balance the load and measuring the elongation of the spring in response to said tension and means for indicating the balance of the beam; thrust transmitting means mounted on the outer swinging end of the beam and, exposed on the upper and lower sides of the swinging end of the beam as to portions aligned in the direction of the spring tension, means providing a point contact with the said lower exposed portion of said transmitting means and connected to said spring to apply said spring tension to the beam in opposition to the load and a widely multiplying balance indicator lever pivoted adjacent the end of the beam and having a point contact with the upper exposed portion of said thrust transmitting means, the indicator having a long arm extending along the spring to a point of balance indication said point contacts being in approximate alignment in the direction of the spring tension.

3. In a manually portable wheel scale having a beam with means for transmitting to the beam from the platform pressures proportionate to the loads and a spring for balancing the beam in opposition to the load in weighing; means connecting the spring to the outer end of the beam and having a point contact with the beam from beneath means for applying stress to the spring to balance the beam, and a widely multiplying balance indicator lever pivoted adjacent the said outer end of the beam and having a point contact with the beam substantially opposite the first mentioned contact said point contacts being approximately aligned in the direction of the spring stress.

4. In a manually portable platform scale of the drive-on type, having a beam with means for transmitting to the beam from the platform, pressures proportionate to the loads and a helical spring for balancing the beam in opposition to the load in weighing; means connecting the spring to the outer end of the beam, and having a point contact transmitting beam pressures to the spring, said point contact being in alignment with the spring axis, a widely multiplying balance indicator lever pivoted adjacent the said point contact and having a short arm with a point contact substantially opposite the first said contact transmitting the balancing action of the beam to said indicator lever which has a long multiplying indicating arm extending along the spring to a point of balance indication means seated in and extending vertically through the swinging end of the beam on the ends of which latter means said contacts are located.

5. In a manually portable platform scale of the drive-on type, a beam, means for transmitting to the beam from the platform pressures proportionate to the load, a helical spring for balancing the beam in opposition to the load in weighing, a yoke connecting the spring to the outer end of the beam, and having a point contact with the beam from beneath, a multiplying balance indicator lever pivoted intermediately opposite the end of the beam, said pivot extending horizontally and transversely to the width of the beam, said indicator having a point contact with the beam in line with the yoke contact and approximately enclosed by the yoke, both said contacts being in alignment with the spring axis, the indicator having a long indicating arm and a short arm extending from its pivot to said axis, the contact of the short arm of the indicator with the beam being in said yoke.

6. A manually portable scale of the drive-on type, having a beam with means for transmitting to the beam from the platform pressures proportionate to the loads and a helical spring for balancing the beam in opposition to the load in weighing, means having a point contact in line with the spring axis for connecting the spring to the outer end of the beam, a multiplying balance indicator pivoted on an axis spaced outwardly beyond but closely adjacent the said outer end of the beam and having a short arm with a point contact opposite the first said contact transmitting the balancing action of the beam to the indicator, the indicator having a long indicating arm extending to a point of balance indication, said spring connection having means whereby the beam pressures are uniformly distributed about the circumference of the spring at one end and means for applying tension to the opposite end of the spring, also comprising means whereby said tension is uniformly distributed about the circumference of the spring maintaining the spring axis in uniform rectilinear alignment at all times.

7. In a platform scale of the drive-on type, having a beam, a helical spring for balancing the beam, the spring having at one end means including a yoke encircling the beam and providing a point contact connection of the beam with the spring, means for taking up the other end of the spring to a measurable extent, a balance indicator with a short arm having a point contact connection with the beam within said yoke and adjacent the outer end of the beam and in substantial alignment with the spring axis and said first mentioned point contact whereby the spring is connected to the beam, said indicator having a fulcrum axis transverse to the beam and adjacent its swinging end and a long indicating arm extending along and adjacent the spring.

8. A portable wheel load scale of the drive-on platform type having a horizontal beam and means for transmitting pressure to the beam proportionate to the load on the platform, means for balancing said pressure on the beam comprising a spring arranged to contract and expand in a horizontal direction and means connecting one end of the spring to the outer end of the beam whereby limited vertical movement of the latter is translated into horizontal movement of the former, and means for manually applying tension to the spring to balance the load on the platform and means for measuring the elongation thereof comprising a widely multiplying balance indicator operatively connected to said beam, said balance indicator being of bell crank form having a short arm depending in substantially vertical position and its long arm substantially horizontal.

9. A portable wheel load scale of the drive-on type having a horizontal beam and means for transmitting pressure to the beam proportionate to the load on the platform, means for balancing said pressure on the beam comprising a horizontally disposed spring adapted to contract and expand in a horizontal direction and means connecting one end of the spring to the outer end of the beam whereby limited vertical movement of the latter is translated into horizontal movement of the former, and means for manually applying tension to the spring and measuring the elongation thereof, said connecting means comprising a bell crank lever having an approximately horizontal arm connected to the beam and an approximately upright arm connected to said spring, said bell crank lever being mounted to oscillate in response to the motion of the beam in weighing and a widely multiplying balance indicator in the form of a bell crank lever, having a short arm approximately vertical and connected to the upright arm of said first mentioned bell crank lever and a relatively long approximately horizontal indicating arm.

10. A portable wheel load scale of the drive-on platform type having a horizontal beam and means for transmitting pressure to the beam proportionate to the load on the platform, means for balancing said pressure on the beam comprising a horizontally disposed helical coil spring and means for transforming the vertical pressures at the end of the long arm of the beam to horizontal pressures, means for connecting the spring to said transforming means said connecting means having a point contact with the latter, a multiplying balance indicator lever pivoted adjacent the transforming means and having a point contact with the latter, said contacts being in alignment with the spring axis, means for applying tension to the spring in opposition to the load and measuring the elongation thereof.

11. A portable wheel load scale of the drive-on type having a horizontal beam and means for transmitting pressure to the beam proportionate to the load on the platform, means for transforming the vertical pressures at the end of the long arm of the beam to a horizontal pressure, means for balancing said latter pressure comprising a horizontally disposed helical coil spring for balancing the beam in opposition to the load in weighing, means for connecting the spring to said transforming means having a point contact therewith, a multiplying balance indicator lever pivoted adjacent the transforming means and having a point contact therewith, the spring contact being in alignment with the spring axis, means for applying tension to the spring in opposition to the load and measuring the elongation thereof, means for normally applying tension to the spring in the no-load position of the beam to keep the spring from sagging and to maintain said contacts in alignment.

12. In a platform scale for wheel load weighing, said scale being of extremely short vertical dimension and without upward projecting portions and having a beam, a knife edge carried at the outer end of the beam, a bell crank lever mounted for tilting movement about an axis, and having a horizontal arm and an upright arm, a knife edge seat carried by the horizontal arm of the bell crank lever adjacent the outer end thereof and a unitary transfer block interposed between the knife edge and seat, said block having a knife edge seat in engagement with the beam knife edge and a knife edge in engagement with the lever knife edge seat, a balance spring connected to the upper end of the upright arm of the bell crank lever and a widely multiplying balance indicator in the form of a bell crank having a short vertical arm connected to said upright arm and an elongated horizontal arm with a balance indicating mark at its swinging end.

13. A portable wheel load scale of the drive-on type having a horizontal beam and means for transmitting pressure to the beam proportionate to the load on the platform, means for balancing said pressure on the beam comprising a bell crank lever pivoted for tilting movement about an axis and having one arm thereof connected to the beam, a horizontally disposed spring connected to the other arm of the lever in opposition to the load exerted thereon by the beam, means for manually applying tension to the spring and measuring the elongation thereof, a widely multiplying balance indicator operatively connected to a portion of the scale which moves in the weighing operation and a second spring likewise connected to a moving member of the scale and in opposition to the first mentioned spring normally applying a tension to said first mentioned spring in the no-load position of the beam to give said indicator a definite no load position.

14. In a manually portable wheel load scale of the drive on, platform type having a beam and a spring for balancing the load on the beam, a screw for applying stress to the spring to balance the load on the platform, and means for interpreting the deflection of the spring in terms of the load comprising a rotary counter to be rotated in correspondence with the screw as the latter is turned in balancing the load, means whereby the counter is connected to and released from the screw at the will of the operator and means for turning the counter independently of the screw for purposes of correction.

15. A portable wheel load scale of the drive on platform type, having a horizontal beam and means for transmitting pressure to the beam proportionate to the load on the platform, means for balancing the load comprising a spring member adapted to contract and expand in a horizontal direction and means connecting one end of the spring member to the outer end of the beam whereby vertical movement of the latter is translated into horizontal movement of the former, means for applying tension to the spring to balance the load and means for interpreting the deflection of the spring in balancing the load, in terms of load and means for indicating the balanced position of the beam in both loaded and unloaded condition, said latter means comprising a widely multiplying balance indicator connected to the outer swinging end of the long arm of said beam said indicator having a horizontally elongated balance indicating arm.

DAVID MIDDLEMAN.